United States Patent [19]

Russell et al.

[11] 3,889,103

[45] June 10, 1975

[54] ELECTRONIC TIMER PRINTER

[76] Inventors: Lewis B. Russell, 1469 N. Glassell; William F. Kelly, 745 N. Lemon, both of Orange, Calif. 92667

[22] Filed: July 5, 1973

[21] Appl. No.: 376,626

[52] U.S. Cl.......... 235/61.9 A; 235/92 GA; 340/306

[51] Int. Cl..... G06K 1/12; G06F 7/38; G08B 25/00

[58] Field of Search. 235/92 T, 92 G, 92 C, 61.9 R, 235/61.9 A, 92 EA, 92 GA; 340/152 R, 306, 309.2

[56] References Cited

UNITED STATES PATENTS

| | | | |
|---|---|---|---|
| 2,310,418 | 2/1943 | Ghertzmann | 235/61.9 A |
| 2,559,746 | 7/1951 | Ahlberg | 340/306 |
| 3,448,459 | 6/1969 | Margolis | 235/92 GA |
| 3,517,165 | 6/1970 | Peyton | 235/61.9 R |
| 3,593,008 | 7/1971 | DeWitt | 235/92 T |
| 3,622,995 | 11/1971 | Dilks | 235/61.9 R |
| 3,637,989 | 1/1972 | Howard | 235/61.9 R |
| 3,643,063 | 2/1972 | Marsh | 235/61.9 A |
| 3,781,529 | 12/1973 | Abramson | 235/92 GA |

*Primary Examiner*—Daryl W. Cook
*Assistant Examiner*—Robert M. Kilgore
*Attorney, Agent, or Firm*—John E. Wagner

[57] ABSTRACT

An electronic timer for producing a printed record of time intervals. The timer includes manual, photoelectric, acoustic signal, and other trigger source actuation and can simultaneously measure and record two or more events on separate channels and produce printed records for each.

The apparatus is powered by self contained batteries which power a clock oscillator, all electronic timing circuitry and the record or paper tape mechanism.

The timer includes a pair of time counters and storage for each channel which allow the continuous measurement of total time while measuring and recording intervals such as individual laps.

The interval recorder automatically commences measuring a new interval upon termination of the last interval whereby the timer may record continuous sequences of intervals while simultaneously recording the overall time.

The apparatus includes a printing and paper advance mechanism including solenoids which drive the paper against marking devices to indicate the appropriate indicia as the paper is discharged.

17 Claims, 11 Drawing Figures

ELECTRONIC TIMER PRINTER

BACKGROUND OF THE INVENTION

Observation of swimming and auto racing competitive events and conversations with participants has revealed the customary use of stop watches for event timing to be marginally satisfactory at best. The typical stop watch has in its favor ready availability, moderate cost, and small size. However, the stop watch is subject to "reading" errors (particularly by inexperienced operators), its accuracy, although potentially sufficient in most cases, is seldom checked, and even the multifunction stopwatches are not adequate to provide all the data many observers desire. For the latter reason it is not uncommon to see two or three stop watches mounted on a special clip-board so an observer can determine total elapsed times, "lap" times, and perhaps the lead of one competitor on another. Although such is the best timing setup generally available and may cost $200.00 to $300.000, the user must operate the watches, read the dial faces, and jot down the results, often all in a short, noisy, confused period of time. It is no wonder there are many errors in the actuating, reading, writing, and also in the arithmetic sometimes required.

On the other hand, complex fixed installation electronic timers have been developed for sporting events. Such timers usually are expensive, inflexible and provide a visual readout for audience and officials but seldom a printed readout.

BRIEF STATEMENT OF THE INVENTION

Faced with this prior art and a continuing need, we have developed an improved portable timer capable of being hand carried and operated at the most advantageous place for timing an event. The timer includes multiple channels for simultaneously or independently recording two or more competitors and produces printed records of their interval (lap) times as well as total times.

The timer includes self contained power supply, an internal clock oscillator, interval and continuous timing registers and buffer storage registers for timing information. Also included is a paper storage chamber and feed mechanism for advancing the paper record by a single frame responsive to the signalling of the end of an interval or total event. A printing mechanism responds to the paper advance and the timing information stored in the registers and marks the appropriate data on the paper record.

BRIEF DESCRIPTION OF THE DRAWINGS

This invention may be more clearly understood from the following detailed description and by reference to the drawings in which.

DETAILED DESCRIPTION OF THE INVENTION

Figures 1, 1A, 2:
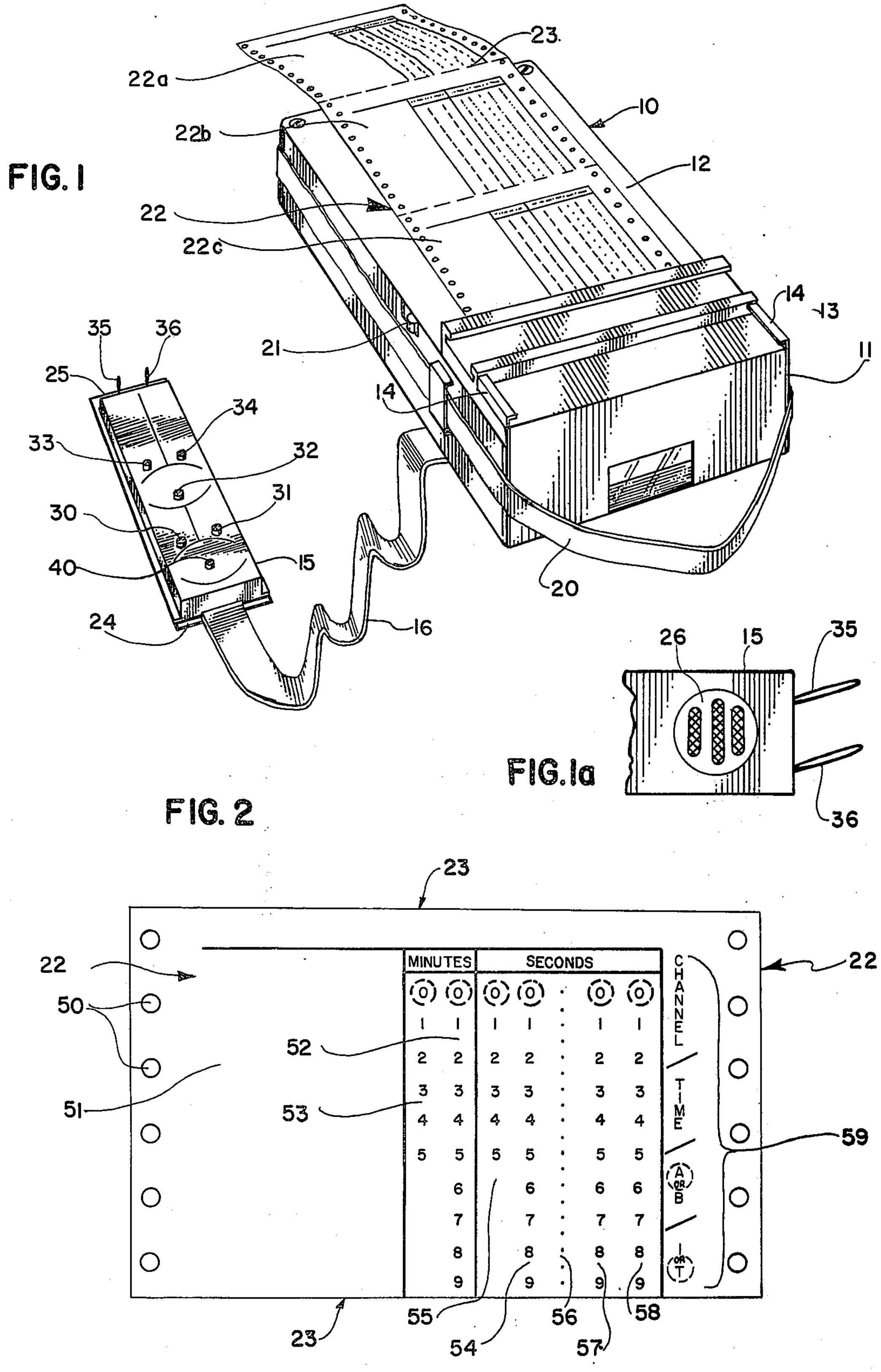
FIG. 1 is a perspective view of a timer in accordance with this invention.
FIG. 1A is a rear view of the hand control of the timer of FIG. 1.
FIG. 2 is a front view of one frame of the record employed in this invention.

Now referring to the drawing of FIG. 1, an electronic timer 10 in accordance with this invention may be seen as including a housing 11 including a platform 12 which covers a major surface area of the upper side of the housing 11, a ledge portion 13 including a pair of tracks 14 for storage of a hand control unit 15 which is connected to the housing by a flat conductor 16. The timer 10 includes a hand carrying strap 20 and an on-off switch 21 on the side of the housing 11.

Extending out of the ledge portion 13 and on to the platform 12 is an edge perforated paper tape 22 including a plurality of individual segments *22a*, *22b* and *22c* designated in the order that they exit from the timer. The indicia display tape is described better in FIG. 2 but suffice to say it includes a printed readout of time intervals and total time as described below. Between each of the segments, for example *22a* and *22b* are perforations 23 so that each segment may be separated from the others if desired.

With the exception of the on-off switch 21, all of the controls for the timer are contained in the hand control unit 15. As indicated above, the hand control 15 may be clipped to the timer housing 11. This is accomplished through edge slides 24 and 25 on the hand control unit which engage the tracks 14 on the housing. Under these circumstances, all of the controls are affixed to the housing. The more common and practical use of the timer employs the hand strap 20 which may be extended to be used as a neck strap and the hand control 15 is supported in the palm of the hand of the user. Contained within the control 15 are eight switches which are identified below along with their function, and a microphone 26 appearing in FIG. *1a* is located on the underside of the control 15 and so positioned to be exposed to ambient sounds when the control 15 is hand held. The individual controls and their functions are as follows:

| Name | Reference Numeral | Function |
|---|---|---|
| Channel A start | 30 | Commence timing, Channel A |
| Channel B Start | 31 | Commence timing, Channel B |
| Start both channels | 32 | Commence simultaneous timing Channels A & B |
| Channel A Event time | 33 | Record time of interval or total for Channel A |

-Continued

| Name | Reference Numeral | Function |
|---|---|---|
| Channel B Event time | 34 | Record time of interval or total for Channel B |
| I/T Switch, Channel A | 35 | Select interval, total time, or both, Channel A |
| I/T Switch, Channel B | 36 | Select interval, total time, or both, Channel B |
| Gun Start | 40 | Energize microphone 26 to initiate timing. |

Each of the foregoing switches 30 through 34 and 40 are momentary push nonlocking switches and switches 35 and 36 are three position selector switches.

Each of these switches and their innerconnecting wires from the microphone 26, FIG. 1*a* are connected to the cooperating circuitry within the timer via the ribbon conductor 16.

Now referring to FIG. 2, the nature of the readout of the timer is apparent and is easily explained. One section of the paper tape 22 is reproduced in FIG. 2 and enlarged in form. It is actually the initial section 22*a* appearing in FIG. 1. It includes edge perforations 50 which engage drive cogs in the paper drive mechanism within the housing 11 and which are used to advance the tape one frame width as designated in the drawing, and in this case, six perforations. The actual dimensions of a frame in a preferred embodiment are 3 inches by 5 inches.

The frame includes a large open area 51 which may be used for hand writing of identification data of the timing information recorded. The frame is preprinted with a plurality of columns with two columns 52 and 53 for recording units and tens of minutes respectively. The next two columns 54 and 55 are for recording units and tens of seconds respectively. There is a preprinted decimal column 56 and columns 57 and 58 for recording tenths and hundredths of seconds. The frame also includes a printed identification column 59 for the printing of the identification of the A or B channel and whether the time is interval or total. As illustrated in FIG. 2 showing frame 22*a* for the initiation of any timing operation, the time is indicated by circles which are printed over the appropriate number of indicia by a stamping mechanism within the timer described below. Stamped circles are those illustrated in the drawing as interrupted circles to distinguish them from the preprinted indicia on the frame. In practice the preprinting is typically in black on white paper and the printed indicia may be by red, blue or other contrasting color stamping similar to a stamp pad type of registration. Each of the columns are preprinted with numbers 0 through 9 with the exception of the tens of seconds column and the tens of minutes column which are preprinted with 0 through 5 to be compatible with the desire to measure time in hours, minutes, and seconds. In this example only the minutes and seconds are recorded. Where longer intervals are desired to be recorded, the tens of minutes column may include a full list of 0 to 9 numerals and a further 100's of minutes may also be added, or, one or more "hour" columns may be added. Of course, the timing circuitry would include larger storage but all within the same principal of operation of this timer. Each frame as illustrated in FIG. 2 denotes a single time instant relative to the initiation of timing and further identifies which channel the time instant belongs to and whether the reading denotes an interval or total reading. A minimum of two frames (one start, one time) are used to denote one single time interval. Subsequent measurements in the same race require one frame per measurement.

Figure 3:
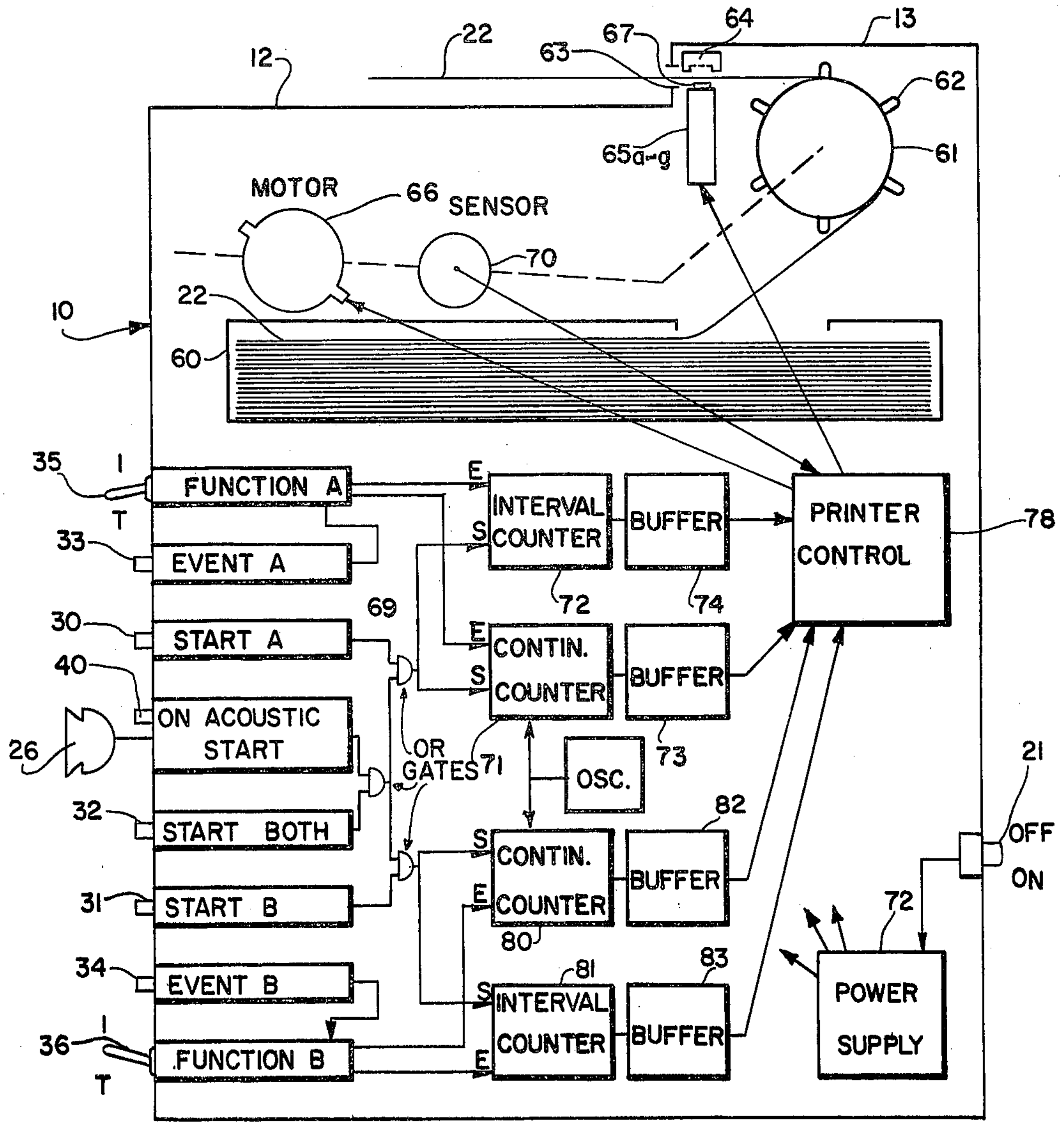
FIG. 3 is a block diagram and mechanical schematic drawing of this invention.

Now referring to FIG. 3, the basic components of the entire timer and their interrelationship are illustrated in block diagram and simplified mechanical schematic form. For purposes of convenience and clarity, all of these switches contained in the separate hand control are illustrated as a part of the overall timer 10 and each bear the same designation as appearing in FIG. 1.

Basically the mechanical portions of the system include a paper supply chamber 60 in which a number, for example 300, of preferably fan folded sheets of frames 22 are stored. These frames are fed from the storage chamber 60 over a drive roller 61 including a plurality of edge pins 62. For simplicity, one frame equals one revolution of the drive roller and six pins of advance. The drive roller 61 is positioned approximately at the level of the paper exit 63 in the ledge 13 whereby the paper 22 exits over the platform 12. Between the drive roller 61 and the exit 63 the ink pad 64 is positioned within the ledge 13 on top of the paper and the solenoid assembly 65 is positioned below the paper 22 and directly below the ink pad 64.

Each solenoid of the assembly includes a plunger which is driven upward against the paper when actuated. Therefore as each plunger is actuated, the paper is pressed locally against the stamp pad 64 and a mark placed on the paper.

The drive system also includes a motor 66 which is coupled to the drive roller 61 and additionally coupled to an angle sensor 70 which is capable of sensing and registering one-twelth revolution of the drive roller 61. The solenoids 65 and motor 66 and angle sensor 70 are all connected to the printer controller circuit 78, the contents and functions of which are better described in connection with FIG. 8. Suffice it to say, the printer controller circuit 78 periodically (in response to Start and Event button actuation) energizes the motor 66 and a response to stored timing information and the state of advance of the paper 22 as registered by the angle sensor 70 serves to energize appropriate solenoids 65. As each solenoid 65 is energized, its plunger 67*a* through 67*g* is driven upward against the underside of the tape 22 which in turn is driven against a local area of the stamp pad 64 to produce a visible marking on the upper surface thereof.

The printer controller 78 as indicated above is under the control of the timing circuitry and the external input of information via the external control buttons. The basic operation of the timer is illustrated in connection with function of Channel A employing Start switch 30, event switch 33 and function switch 35. The start switch 30 is connected via lead 69 to the S or start input terminals of a pair of counters, continuous counter 71 and an interval counter 72. These counters 71 and 72 are in turn connected to respective buffer storage devices, buffer 73 and buffer 74 which are typically shift registers.

The event switch 33 is similarly connected to the two counters 71 and 72 but via the function switch 33. The function switch having preferably three positions, interval, total time, or both, selectively connects the control button to either the continuous counter 71 used for total timing or the interval timer 72 for registering interval time or to both for registering both interval and total time. As illustrated in the drawing, the function switch 35 is positioned to connect switch 33 to the continuous counter 71.

In a typical operation, the timing function is commenced by operating the start button 30 which energizes both counters 71 and 72. These counters continuously count pulses supplied by the oscillator 112 and store the count for subsequent introduction into buffer 73 and 74, the buffers 73 and 74 having been reset after the previous timing operation. When the event button 33 is operated denoting the end of a timing cycle, the time count information is copied into the appropriate buffer 73 or 74 and the appropriate buffer storage is then available to be read out, in this case, the buffer 73.

At the end of the timing cycle and the filling of the buffer 73, the printer control actuates the motor 66 to drive the drive roller 61 one frame or one revolution. At each one twelfth revolution as sensed by the angle sensor 70, the solenoids are in position to possibly register a digit. In each of the separate columns corresponding to the digits in the buffer storage, the corresponding solenoid is actuated encircling the correct number when it appears over the solenoid. The printer controller also energizes the solenoid under printed column 59 as the printed T indicative of total time passes through the printing station and also for the A to indicate the A channel was timed, as illustrated in FIG. 2.

The circuitry of Channel B is virtually identical with that of channel A including a start switch 31, an event switch 34 and function switch 36. These are interconnected in the same way to a continuous counter 80 and interval counter 81 each with their respective buffer storage 82 and 83 which in turn are connected to the printer controller 78.

In addition to the individual start button 30 and 21 for each channel, in a typical timing operation where there are two competitors, it is desirable to start the timing function for both simultaneously and record the performance times individually. To start the timing functions simultaneously for both channels switch 32 may be depressed. It serves to replace switches 30 and 31.

Additionally, whenever the switch 40 is actuated, the start function responds to the next loud sound reaching the microphone 26. This is termed the acoustic start and is used when the timing function is to be initiated by the starter's gun as in many athletic events. The acoustic start switch and circuitry typically employs a variable threshhold circuit to avoid false starts. The makeup of the several circuits described functionally in this connection will be better understood by reference to FIGS. 6 and 7 below, however, prior to that information, a brief description to the mechanical and printing functions is deemed desirable.

Figure 4:
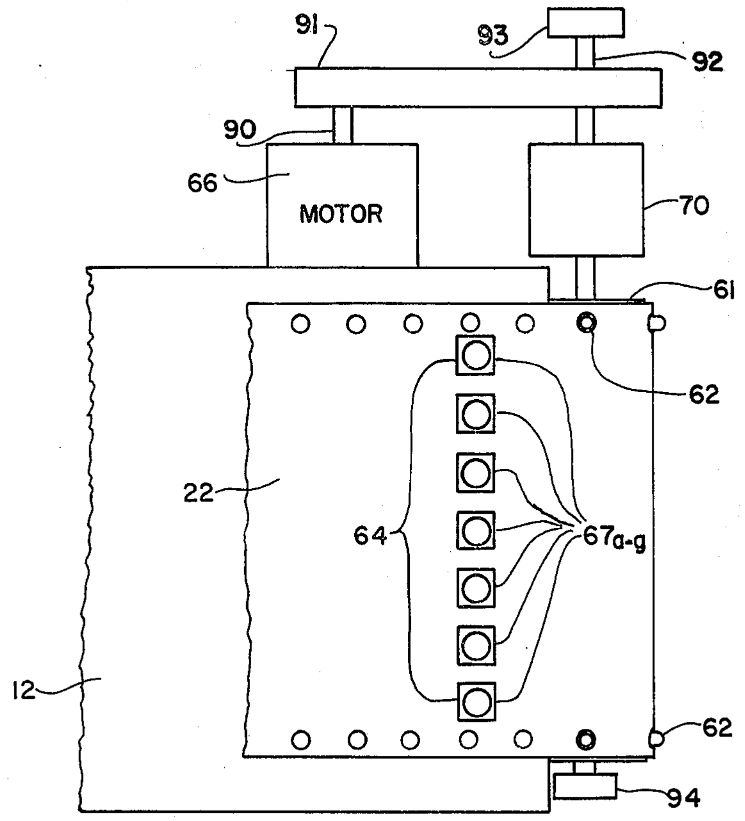
FIG. 4 is a simplified fragmentory top view of the paper advancing and printing mechansim of this invention.
Figure 5:
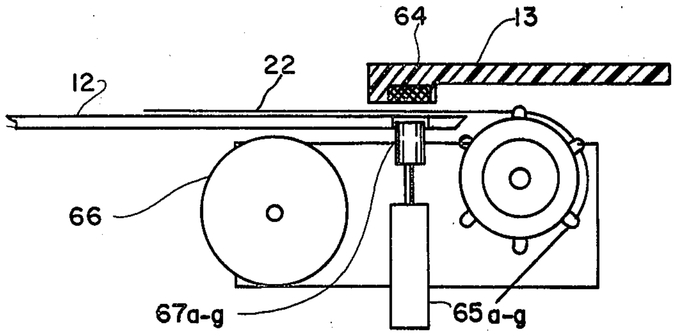
FIG. 5 is a simplified fragmentory side view of the paper advancing and printing mechanism of this invention.
Figure 9:
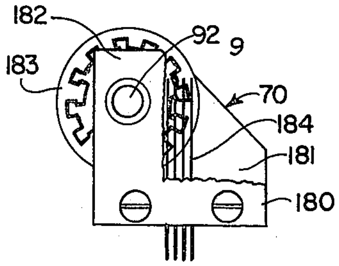
FIG. 9 is a side elevational view partly broken away of the angle sensor or position encoder of this invention.
Figure 8:
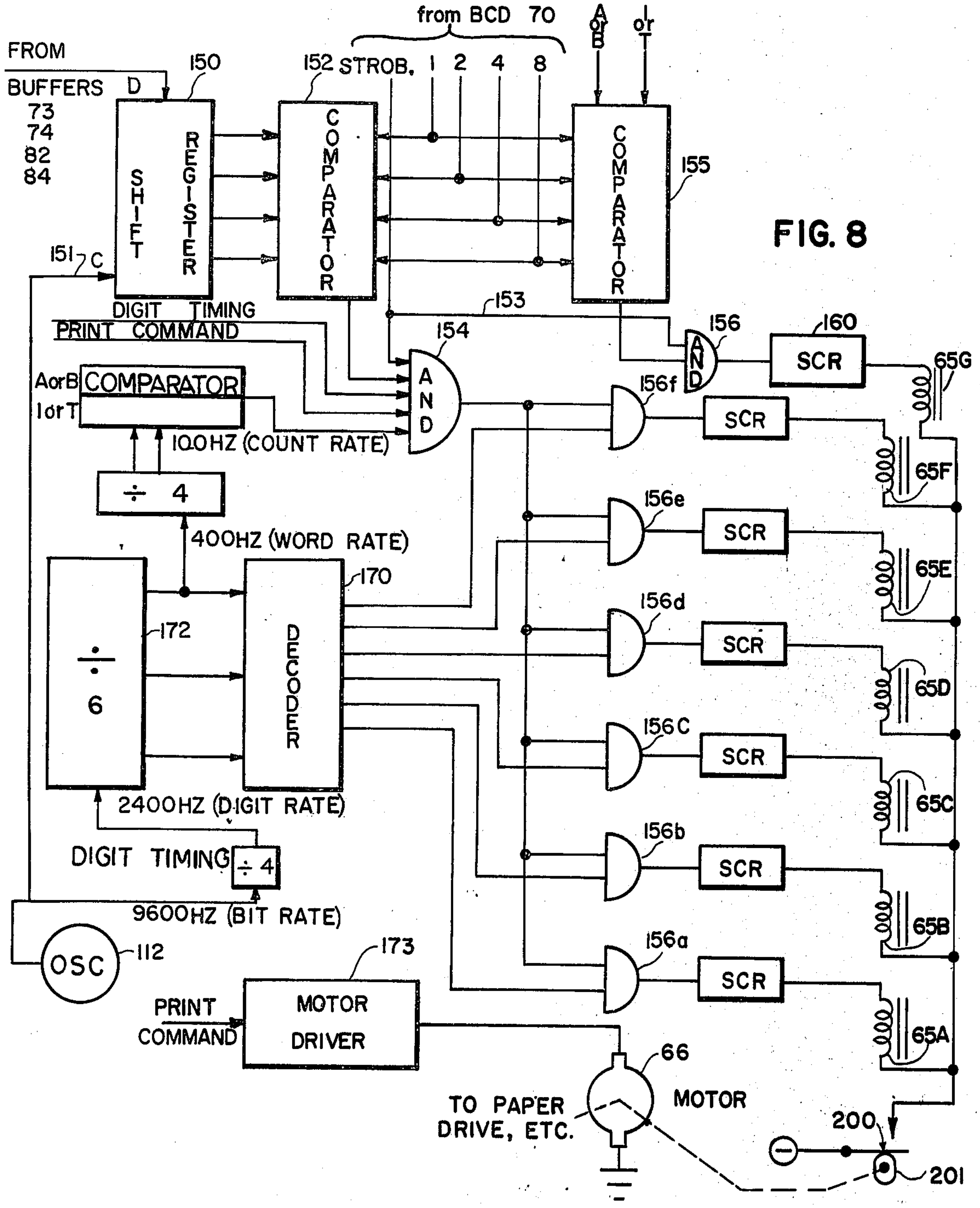
FIG. 8 is a block diagram of the printer controller of this invention.

Now referring to FIGS. 4 and 5, the operating relationship of the printing mechanism and paper advance system may be seen. FIG. 4 illustrates the top view of the paper advance and printing mechanism with the ledge 13 of FIG. 1 removed. This mechanism includes basically a D.C. motor 66 driven by a self contained battery within the apparatus represented as power supply 79 of FIG. 3. Motor 66 through its shaft 90 and the reduction gear 91 drives the main paper advance roller shaft 92 which is journalled in bearings 93 and 94. Between the reduction gear 91 and the roller 61 is the shaft angle sensor 70 which may for example be a disc or other type of rotating encoder. The preferred embodiment is illustrated in FIGS. 8 and 9. The roller 61 shows a plurality, for example, six paper advance pins 62 on each end of the roller coinciding with the edge perforations of the paper web 22 which lies on top of platform 12. Extending transversely across the paper web 22 is a single stamp pad 64 having embossed circles opposite the solenoid plungers 67 *a–g*. The circle embossment determines the shape of the mark produced on the paper through impact on the paper from a solenoid plunger positioned below the paper. This may be more apparent by reference to FIG. 5 showing the arrangement in more detail. The solenoids 65 a through g, each have their respective circular plunger 67*a–g* passing through openings in platform 12 to strike the underside of the paper web 22 and drive it against the stamp pad 64. The plungers 67 *a* through *g*, preferably are circular and the stamp pad embossment produces a ring imprinted on the paper around the appropriate digit. The solenoids 65 do not operate simultaneously except in the particular case where all the same digits are to be registered at the same time. This occurs usually only during the initial starting condition where zeros are registered on each of the timing channels. Thereafter each plunger and solenoid operate at the appropriate instant as the paper passes between the plunger and the stamp pad at the correct one-twelth revoltuion. For example, where the following time is to be recorded for Channel A as an Interval Time, the solenoids will be actuated at the following angles of rotation as sensed by the angle sensor.

Time: 1 Minute 27:26 Seconds

| Column | Symbols to be Printed | Actuation Position | Angle Sensed Position 30° |
|---|---|---|---|
| 59 | A,I | 6,8 | 180°, 240° |
| 53 | 0 | 0 | 0° |
| 52 | 1 | 1 | 30° |
| 55 | 2 | 2 | 60° |
| 54 | 7 | 7 | 210° |
| 57 | 3 | 3 | 90° |
| 58 | 6 | 6 | 180° |

Figure 11:
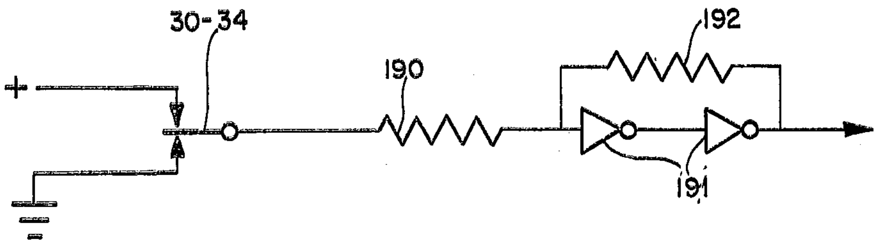
FIG. 11 is a simplified schematic diagram of a preferred form of anti bounce circuit.
Figure 6:
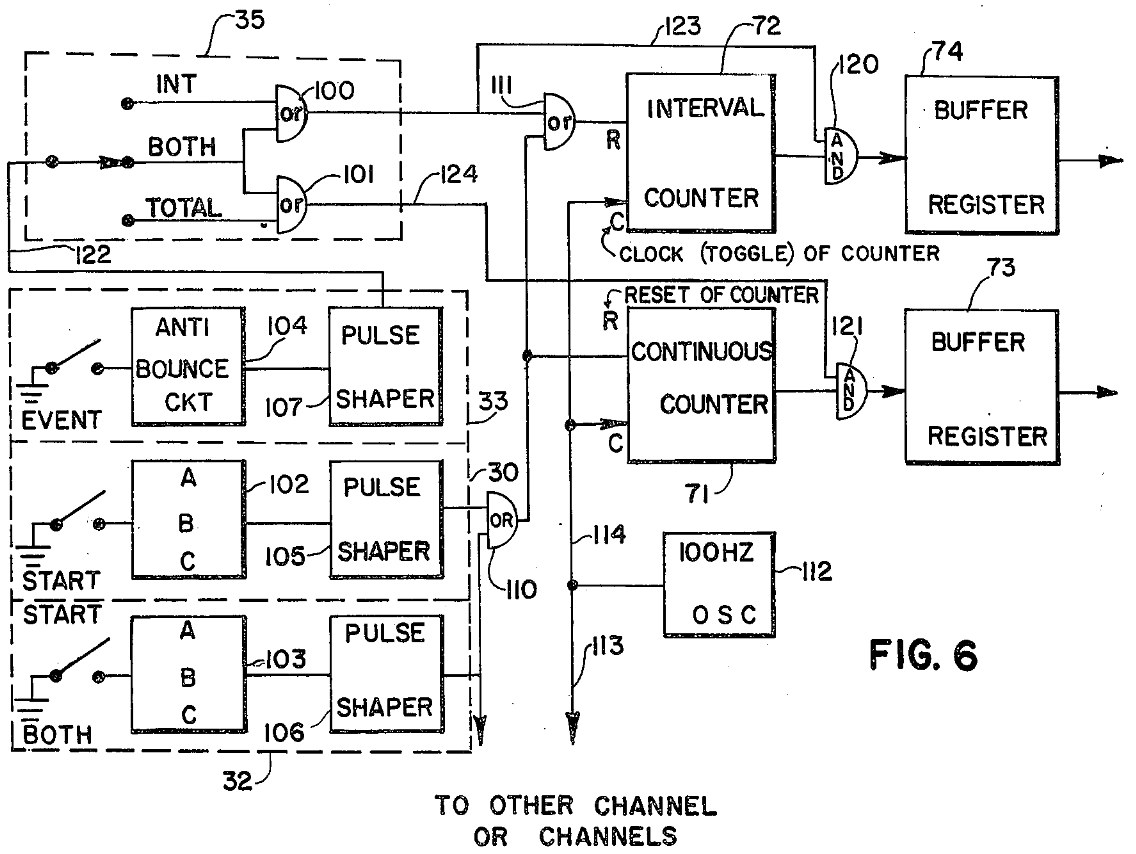
FIG. 6 is a block diagram of the timing circuitry of this invention.
Figure 7:
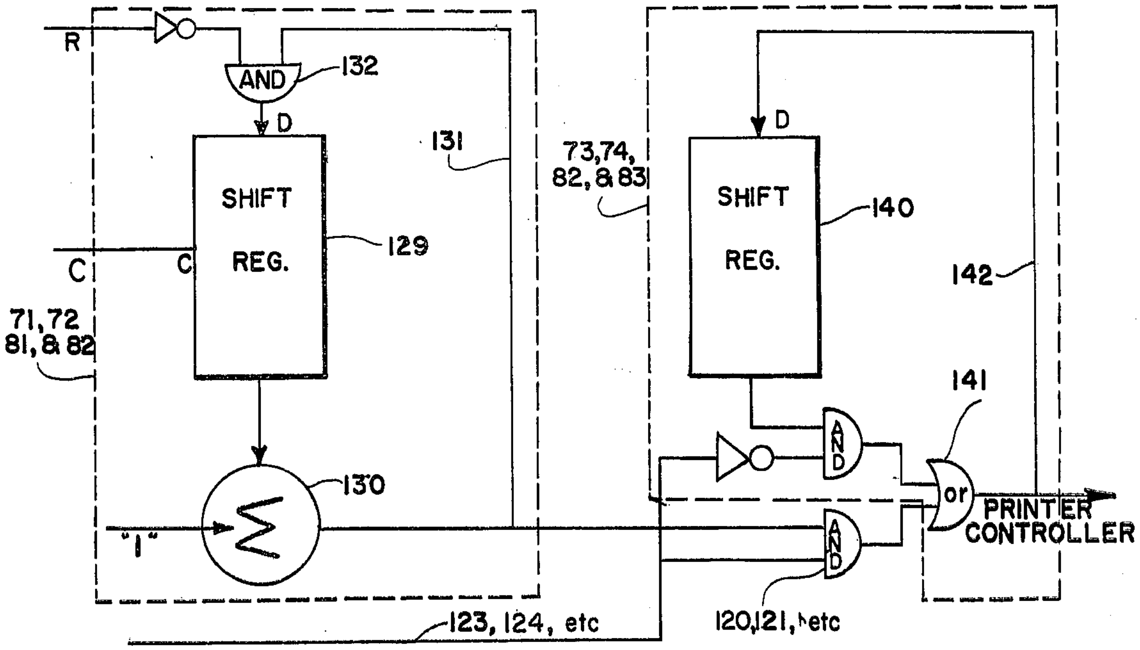
FIG. 7 is a block diagram of a preferred embodiment for the interval and total timers and buffer registers of this invention.

The circuitry capable of performing the timing and the actuation of the printing mechanism as shown in block diagram form in FIG. 3 is represented in more detail in FIGS. 6, 7 and 8 to which reference is now made. FIG. 6 shows in more detail the circuitry associated with Channel A. The several switches include the Start switch 30, Event switch 33, Start Both Channels switch 32 and the Function switch 35. The latter may be seen as including not only a mechanical switch but also a pair of OR gates 100 and 101 which provide the logic function of selecting which timer counter 71 and 72 is to be reset and which count is to be transferred to the printer controller 78. Each of the nonlocking switches 30, 32 and 33 also include a respective antibounce circuit 102, 103 and 104 of the type illustrated in FIG. 11 which serve to suppress any transients or double pulses produced at the moment of switch closure. Additionally, each of said switches includes a pulse shaping circuit 105, 106 and 107 respectively all of which cooperate with their respective physical switches to produce a single, clear, defined pulse for each switch operation. Therefore, each of these components identified in the dashed boxes as 30, 32 and 33 provide the function of producing a clear distinct, rectangular pulse for each operation of the switch. The two start switches 30 and 32 are connected by an OR gate 110, connector 70, and OR gate 111 to the event or reset input of the interval timer 72. The start switches 30 and 32 likewise are connected through OR gate 110 and then directly to the event or reset switch of the continuous timer 71.

The basic timing function in the timer is produced by a free running oscillator 112 having a frequency for example of 100 Hertz connected to all timers 71, 72, 82 and 83 in the system via connectors 113 and 114. Employing a common clock for all timers all timing operations are synchronized. The frequency of this timers, 112 is sufficiently high to afford the required resolution of the timer, namely one one-hundredth of a second, and must be stable enough to meet the accuracy requirement of the user. The oscillator may be of various constructions, however a high frequency quartz crystal oscillator and countdown circuit is used in the unit described.

The two buffer registers 73 and 74 used for interval and total times are connected as indicated above to their respective timer or counter 71 and 72. This connection, however, is via a respective triggered gates 121 and 120. The gate 120 is under the control of pulses via the function switch 35 from the event switch 33 over lead 122, OR gate 100, and lead 123. Therefore whenever the function switch is in the interval time or both interval and total time position and the event switch 33 is operated, the gate 120 is enabled and the number of counts stored in the interval timer is copied into the buffer register 74 and at the same time, OR gate 111 is activated causing interval counter 72 to reset to zero. Similarly, whenever the function switch 35 is in the total time or the BOTH time position, the event pulse from switch 33 is applied over lead 122, OR gate 101, lead 124 to trigger gate 121 and copies the count in timer 71 into the buffer register 73 for subsequent discharge via the printer controller to be recorded on the tape. The continuous counter, however, is not reset by the event pulse.

The preferred implementation of the interval counter 71 and 72 and buffer registers 73 and 74 is disclosed in FIG. 7. Typically, the counters 71 and 72 will include a conventional shift register 129 driven by incoming clock pulses on the C input and through a feed back loop including a serial adder 130 and conductor 131 and an AND gate 132. Serial adder 130 is fed by pulses representing a count of "1" which in this example represents a time increment of 0.01 seconds. This arrangement allows a most economical design of the timer storage and particularly when time sharing of functions is utilized. In particular, the shift register 129 is connected to circulate through the serial adder 130 and a value 1 is added each time the register contents is circulated. The serial adder 130 is made to add in binary coded decimal (BCD) format, with the 4th and 6th digits counting only to "5" instead of "9". Further, if the shift register 129 is made 4 times as long as is required for each of the individual timing functions and is logically subdivided into four parts, the one long shift register 129 and one serial adder 130 suffice for the four counters 71, 72, 81 and 82 of FIG. 3. Note that the contents of shift register 129 must make one complete circulation for each "count," that is, 100 times per second in this example. Hence, the required clock frequency for the shift register is 100N Hz, where the total length of the shift register is N bits.

It is also convenient to use a second identical long shift register 140 as a buffer storage device 73, 74, 82 and 83. In this case, a buffer register is made up of a shift register 140 and OR gate 141 and feedback loop 142. Thus, using a quadruple length shift register 140 and time sharing, it is possible to implement the entire buffer storage functions illustrated in FIG. 3.

The printer controller of this invention is shown in FIG. 8 and acts as the interface between the data of storage portions and the mechanical printout portions of the system. It includes all necessary logic for the printing of the correct timing and function information.

The input to the printer controller of FIG. 8 from all buffers 73, 74, 82 and 83 comes in on a time share basis over a single lead to a four bit shift register 150, which has advance pulses supplied from the oscillator 112, over lead 151. This shift register 150 is continuously fed with the total of 96 bits constituting the six time record digits of four bits each and four possible answers to be recorded. The information is preferably coded in a conventional binary coded decimal form.

The shift register 150 has each stage connected to a comparator 152 which is also connected to the position information input from the paper position coding device or angle sensor 70. This device is shown in its physical form in FIGS. 9 and 10 and described below in connection with these figures, but suffice to say, it will produce a four bit code for each of 12 angular positions of the paper advance drive shaft 92 of FIG. 4.

Basically, the comparator 152 functions to provide an enabling input to an AND gate 154 whenever the position code received from the angle sensor 70 corresponds to the digit in the shift register 150. The binary coding device 70 also produces a strobe signal appearing on lead 153 which constitutes an additional input to AND gate 154, and is used to trigger the time for printing to avoid errors due to transient ambiguities in the angle sensor output.

An additional comparator 155 receives binary coded information from the function switches 30, 31 and 34 indicative of whether the information arriving from the buffer is associated with channel A or channel B, and also whether function switches 35 or 36 are set for interval or total time. This binary coded information introduced into comparator 155 is compared with the position information from the binary coding device 70. Coincidence will occur in comparator 155 when the channel 59 as shown in FIG. 2 is in either the 6 or 7 position to print either an A or B or in 8 or 9 position to print either an I or a T. Simultaneous inputs from the comparator 155 and from the next strobe pulse on lead 153 are fed to AND gate 156 enabling a silicon control rectifier driver 160 to operate solenoid 65g associated with this column 59 on the printed record.

The oscillator 112 is required to produce pulses at the rate at which shifting must occur in shift register 129, 140 and 150. In this example, the required rate is 100 counts/sec × 4 bits/digit × 6 digits/word × 4 words = 9600 Hz. This bit rate controls the shift register and also is divided by four to obtain pulses at the 2400 Hz rate that complete BCD digits appear, for example, in the 4 bit shift register 150. This digit rate is further divided by the modulo 6 counter 172, the count state of which defines (and indicates) which digit of a "time" is currently being processed. The three bit parallel output of counter 172 is interpreted by decoder 170 so that each of its six output lines is responsive to one and only one of the six count states of counter 172. For example, the output line of decoder 172 which goes to AND gate 156*e* will be "TRUE" only when the second (next to the least significant) digit of each word is being processed.

The 400 Hz output of counter 172 is the rate at which full words (of 6 digits) circulate in the shift registers. This rate is divided by 4 to obtain signals which define which channel (A or B) and whether an interval or a total time (I or T) is in process. These signals are compared with signals from the switches 30, 31, 33, 34, 35 and 36 which indicate the type of information to be printed, to obtain an enabling input to AND gate 154.

It should be noted that the various counter and decoder outputs just described are used throughout the system to provide control and synchronization of the multiplexing.

Another input to the AND gate 154 is the digit timing pulse comparable to a frame pulse to indicate the presence of a complete digit in shift register 150. An additional input to the AND gate 154 is the print command signal which rises every time a buffer storage register 73, 74, 82 or 83 is filled and the time to print is recognized. Thus the output of AND gate 154 becomes "TRUE" when there is a coincidence between the value of a proper digit from the buffer and the proper value of the row of digits passing over the solenoids, when there is coincidence between the word (answer) currently available from the buffer and the desired work, when an answer is actually being asked for. This TRUE is routed to the correct solenoid by its coincidence with the one TRUE output of decoder 170 as detected by the AND gates 156*a–f* and their respective silicon controlled rectifiers 160*a–f.*

The print command also enables the motor driver circuit 173 to drive the motor 66. The actual printing function is directly under the control of the motor 166 through a cam operated switch 200 having ten lobes which close the power circuit to the energized solenoids to allow their printing at the exact position in each 30 degrees of paper advance directly overlying the preprinted digits. The presence of this cam 201 assures that each circle printed by the timer will properly encircle the preprinted number without any errors in registration which might give rise to errors in reading. The switch 200 has an additional and perhaps a more significant function in that it serves to break the energizing current to the appropriate solenoid and particularly to its silicon controlled rectifier driver 160*a–f.* This will reset the silicon controlled rectifier for its next possible firing.

Figure 10:
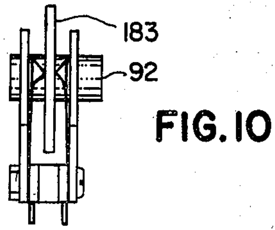
FIG. 10 is a front elevational view of the angle sensor of FIG. 9.

The position encoding of the web or paper is accomplished easily employing the encoder 70 of FIGS. 9 and 10. It includes a frame 180 with a pair of upstanding extensions 181 and 182 which journal the shaft 92 of the paper web advancing system. On the shaft is a code wheel having selected conducting and nonconducting tracks in concentric circular patterns. A plurality of spring wiper contacts 184*a–h* are supported by the frame 180 and in electrical contact with respective tracks on the code wheel. The end of each spring contact extends out of the frame 180 and constitutes the electrical terminal for each contact.

The design of coding wheels is well known in the art and suffice to say, any of several physical configurations may be used to accomplish the required coding pattern such as conventional binary coding.

| NUMERAL CODING | STROBE CODING | NUMERAL OR FUNCTION |
|---|---|---|
| | 0 | |
| 0000 | 1 | 0 |
| | 0 | |
| 0001 | 1 | 1 |
| | 0 | |
| 0010 | 1 | 2 |
| | 0 | |
| 0011 | 1 | 3 |
| | 0 | |
| 0100 | 1 | 4 |
| | 0 | |
| 0101 | 1 | 5 |
| | 0 | |
| 0110 | 1 | 6 and A |
| | 0 | |
| 0111 | 1 | 7 and B |
| | 0 | |
| 1000 | 1 | 8 and I |
| | 0 | |
| 1001 | 1 | 9 and T |
| | 0 | |
| 1010 | 1 | Blank |
| | 0 | |
| 1011 | 1 | Blank |
| | 0 | |

In recording intervals it is essential that the actuation time of each button be detected accurately regardless of the pressure applied by the user. A particular problem is to avoid two pulses as may be caused by switch bounce. This is prevented by the anti-bounce circuit of FIG. 11. Basically, it uses a double throw type of switch to initiate a valid signal. Switches 30–34 each operate manually to change the potential of the switch arm from to ground with each switch operation. This transfer of potential is applied through the Schmitt trigger circuit comprised of resistance 190, amplifiers 191 and feedback resistance 192 to the appropriate counter. This change in potential is essential to register a count. Switch bounce, where the switch is merely open circuited, will not change the state of the counter, thus reliability in switching is enhanced. This is also used on the output of the rotary encoder 70.

All of the foregoing circuitry and paper transport mechanism are powered by internal batteries 72 so that the timer printer of this invention is totally portable. It allows the accurate timing of multiple contestants with either simultaneous or individual start times. Lap times as well as total times for each contestent are recordable. Since two counters and two buffer registers are present for each channel, intervals or laps may be timed and printed out without affecting the clock or timing functions.

The timer printer of this invention produces a written record for each event including the start, each interval and finish without the necessity of any visual readings or observation of the equipment during the contest. The user thus may devote his entire attention to the contest and only press a button to record an event or interval. Employing the acoustic start feature, he need only actuate the appropriate event button to time the end of an interval or event. Then, or perhaps after the pressure of the contest is past, the user may make any notes desired on the chart.

There are several minor variations of the described embodiment of this invention which should be mentioned even though they are generally within the scope of the description. With reference to the purpose of the invention, the area of application of the invention is not limited to sports, but is seen to include industrial, measurement and recording of elapsed time. In some applications a different range of timing may be appropriate, for example to record hours as well as minutes and seconds, or a different resolution may be required, for example 1.0 second or 0.001 second instead of 0.01 second, or a different number of channels may be desired. All these variations are seen to possibly effect the layout of the preprinted paper record, the number of solenoids, the clock frequency, amount of storage, etc., but are within the principles described. A common requirement is for the use of a photo-electric device(s) rather than manual actuation of the START and EVENT switches. This is easily accomplished by appropriate addition (involving generally known techniques) to the input circuitry, as is also the case with a wide array of other types of activators applicable to various sports and industrial applications.

The above described embodiments of this invention are merely descriptive of its principles and are not to be considered limiting. The scope of this invention instead shall be determined from the scope of the following claims, including their equivalents.

We claim:

1. An electronic timer-printer comprising:
a source of timing signals
a counter connected to said source of timing signals for counting signals from said source;
a switch for starting said counter;
a second switch for reading the count of said counter;
a signal storage device;
means responsive to the operation of said second switch for reading signals from said counter to said signal storage device;
a printing device including a motor, a drive roller for advancing a web having printed thereon digital indicia;
a sensor coupled to said drive roller for sensing the longitudinal position of said web;
means responsive to different positions of said web for encoding said positions in the same code as signals contained in said storage device;
means responsive to the reading of information from said counter and storage in said pulse storage means for energizing said motor;
and comparator means responsive to the same code in said storage device as encoded by said position sensor and encoding means for enabling said printing means to produce an identifiable indication on said web.

2. The combination in accordance with claim 1 including at least one additional signal counter, at least one additional pulse storage device , a third switch for terminating the count of signals by said second signal counter and for discharging pulses therefrom into said second signal storage device;
said first switch for enabling said first signal counter being operatively connected to initiate the count of said second pulse counter;
said second signal storage device and connected to said comparator means.

3. The combination in accordance with claim 1 wherein said printing device comprises at least one solenoid;
marking means associated with said solenoid;
said solenoid and marking device being provisioned to embrace the web in fixed position relative to the printer;
said solenoid operable to engage said web and marking device at the section of web passing between said solenoid and
said marking device to provide a visual indication on said web at the selected longitudinal position of the web.

4. The combination in accordance with claim 3 including a plurality of sets of marking devices and solenoids each set positioned transversely across the web and each responsive to said comparator means and energizing sources for said solenoids to produce a plurality of marks on transverse regions of the web.

5. The combination in accordance with claim 3 including a web having a plurality of longitudinal channels wherein individual values of digits are displayed longitudinally on each channel and the plurality of channels combine to constitute a time reading.

6. The combination in accordance with claim 1 including a second signal counter, a second signal storage device and a third switch for selectively introducing timing signals into either or both said first and second counter responsive to said first switch;
said second switch being operative to terminate the introduction into either or both of said counters responsive to the setting of said third switch, whereby either interval or total or both times may be recorded.

7. The combination in accordance with claim 6 wherein said second signal counter includes means for automatic restarting responsive to the termination of count whereby said second counter is operative to count successive of intervals.

8. The combination in accordance with claim 6 wherein said second switch is connected to command discharge of signals stored in second counters when said third switch is in position to introduce signals into said first and second counters or into said second counter.

9. The combination in accordance with claim 6 wherein said second switch is connected to command discharge of said first counter when said third switch is set for said first counter only.

10. The combination in accordance with claim 6 wherein said second switching means is connected to discharge said first and second counters when said third switching means is set for both said counters.

11. The combination in accordance with claim 6 wherein said second switch is connected to discharge said second counter only when said third switch is set for said second counter only.

12. A timer printer comprising
a timing pulse generator,
a pair of pulse counters including a first counter for counting total time and a second counter for counting interval time,
a pair of pulse storage registers connected to respective pulse counters,
a start switch for connecting both of said counters to said timing pulse generator,
a function switch for selecting either or both of said pulse counters for readout,
an event switch connected to both said counters for reading the pulse count of said pulse counters into their respective pulse storage registers as selected by said function switch, information display means connected to both said pulse storage registers, means responsive to operation of said event switch for discharging the pulse count from said pair of storage registers depending upon the setting of said function switch, and means for displaying which of said storage registers was discharged.

13. The combination in accordance with claim 12 wherein said means for discharging the pulse count from said pair of storage registers is operative in response to a "both" setting of said function switch to discharge said registers in sequence.

14. The combination in accordance with claim 12 wherein said means for discharging the pulse count from said pair of storage registers is operative in response to a setting to discharge the first of said registers to discharge both said registers and for displaying only the count of said first register.

15. The combination in accordance with claim 12 including means responsive to discharge of said second pulse storage register for automatically enabling said second counter for continuous introduction of pulses into said second counter.

16. The combination in accordance with claim 12 wherein said display means comprises record web and means for producing a visible mark on said web responsive to operation of said event switch, said display means including web advancing means for advancing said web a predetermined distance for each operation of said event switch, said web having reproduced thereon a plurality of count indicia in predetermined longitudinal displacement, and printer controller means for energizing said mark producing means as said advances at distances related to the count discharged from said register.

17. The combination in accordance with claim 16 including means for encoding displacement of said web advancing means in the same code as said storage register and wherein said printer controller includes means for comparing the encoded displacement of said web advancing means and said count from said storage register and means for actuating said mark producing means responsive to coincidence detected by said comparator.

* * * * *